United States Patent
Pavani

(10) Patent No.: US 11,684,232 B2
(45) Date of Patent: Jun. 27, 2023

(54) REAL-TIME SINGLE DISH CLEANER

(71) Applicant: Sri Rama Prasanna Pavani, San Carlos, CA (US)

(72) Inventor: Sri Rama Prasanna Pavani, San Carlos, CA (US)

(73) Assignee: Dishcare Inc., San Carlos (CA)

( * ) Notice: Subject to any disclaimer, the term of this patent is extended or adjusted under 35 U.S.C. 154(b) by 142 days.

(21) Appl. No.: 17/144,069

(22) Filed: Jan. 7, 2021

(65) Prior Publication Data
US 2022/0211243 A1  Jul. 7, 2022

(51) Int. Cl.
| | |
|---|---|
| *A47L 15/00* | (2006.01) |
| *A47L 15/37* | (2006.01) |
| *A47L 15/13* | (2006.01) |
| *A47L 15/42* | (2006.01) |
| *B25J 9/16* | (2006.01) |
| *B25J 11/00* | (2006.01) |
| *A47L 15/14* | (2006.01) |

(52) U.S. Cl.
CPC ........... *A47L 15/0076* (2013.01); *A47L 15/13* (2013.01); *A47L 15/14* (2013.01); *A47L 15/37* (2013.01); *A47L 15/4295* (2013.01); *B25J 9/1679* (2013.01); *B25J 11/0085* (2013.01); *A47L 2401/04* (2013.01); *G05B 2219/2613* (2013.01); *G05B 2219/39567* (2013.01)

(58) Field of Classification Search
None
See application file for complete search history.

(56) References Cited

U.S. PATENT DOCUMENTS

| | | | |
|---|---|---|---|
| 7,269,479 B2 | 9/2007 | Okamoto et al. | |
| 10,856,719 B2 * | 12/2020 | Dirschus | A47L 15/0018 |
| 2005/0072449 A1 * | 4/2005 | Alpert | A47L 15/46 134/25.1 |
| 2010/0043834 A1 * | 2/2010 | Scheringer | A47L 15/241 134/25.2 |
| 2016/0338567 A1 * | 11/2016 | Kong | A47L 15/10 |
| 2018/0036889 A1 * | 2/2018 | Birkmeyer | B25J 9/1697 |

FOREIGN PATENT DOCUMENTS

CN  108354564 A  8/2018

* cited by examiner

*Primary Examiner* — Rita P Adhlakha

(57) ABSTRACT

A system and method for cleaning a reusable dish, comprising: picking a dirty dish from a load module disposed to contain at least one dirty dish with a robotic arm, wherein said dirty dish is stained with material that needs to be removed prior to reuse; transporting said dirty dish from said load module to a wash module with said robotic arm; cleaning said dirty dish in said wash module having the means to transform said dirty dish into a clean dish, wherein said clean dish does not exhibit any material that needs to be removed prior to reuse; transporting said clean dish from said wash module to a store module with said robotic arm; and dropping off said clean dish in said store module, wherein said store module is disposed to contain at least one clean dish, whereby each dirty dish is cleaned thoroughly and efficiently with individual attention in real time.

20 Claims, 15 Drawing Sheets

REAL-TIME SINGLE DISH CLEANER

FIELD OF THE INVENTION

This invention relates generally to cleaning dishes prior to reuse.

BACKGROUND

The sight of dirty dishes piling up in a kitchen sink is an eyesore for many. Yet the kitchen sink continues to remain as the easiest place to put down dirty plates, bowls, mugs, cups, and silverwares after a meal or a drink.

What is often more painful is to scrape and dispose of leftovers from dirty dishes and frequently rinse dirty dishes before loading them into a dishwasher. Skimping of any of these steps increases the chances of dishes not coming out clean even after a long dishwashing cycle spanning hours. Loading dishes, in particular, can be physically painful as it requires frequent bending to transfer a dish from the kitchen sink, which is typically located at a substantially higher level than an under the counter dishwasher.

Conventional dishwashers are designed for washing a large number of dishes at once. Such batch washing comes with three major problems. Firstly, to conserve resources, many tend to run dishwashers only when the dishwashers are substantially full with dirty dishes. When there aren't enough dirty dishes ready to be cleaned, dirty dishes typically have to wait to get cleaned until a dishwasher is full. During their waiting period, these dirty dishes tend to attract microscopic germs and create unhygienic conditions. Dirty dishes typically also dry out during the waiting period, making them harder to clean at a later time.

Secondly, when washing a large number of dishes together, conventional dishwashers prioritize the average cleanliness of a group of dishes over the thorough cleanliness of every individual dish. Conventional dishwashers typically employ a turbidity detector to measure the quantity of dirt present in water during the cleaning process. When the turbidity detector senses the dirt level to be under a threshold, conventional dishwashers assume that dishes are clean. Such an assumption arrived based on the average state of a batch of dishes often overlooks the state of each individual dish in the batch. Conventional dishwashers do not have the means to ensure every dish is thoroughly cleaned during the cleaning process. This is the reason why dishes often do not come out clean even after hours of washing in a conventional dishwasher. A slew of preparatory work such as scraping, rinsing, soaking, optimal loading and positioning of dishes according to their shape, size, and material becomes necessary to maximize the chances of dirty dishes coming out clean in a conventional dishwasher, albeit without any guarantee of success.

Thirdly, typical dishwashers found in homes are substantially slower than washing the dishes by hand in a kitchen sink; and consume much more water and energy. This is because batch dishwashing lacks the perception and ability to focus on dirty regions of an individual dish. As a result, it spends much more resources on clean regions of dishes than what is necessary, in an attempt to maximize the chances of all dirty regions of dishes to come out clean. Batch dishwashing fundamentally suffers from a tradeoff between the duration of the dishwashing cycle and cleanliness of each dish. Without the perception to evaluate the cleanliness of each dish, batch dishwashing resorts to longer dishwashing cycles, spanning hours, to increase the chances of removing dirt from all dishes, thereby causing a significant wastage of time, energy, and water.

Accordingly, many across the world waste a significant amount of time and energy everyday for simply making sure they have clean reusable dishes ready for their next meal or drink. There is a need for an improved system and method to clean a dirty dish thoroughly, efficiently, and painlessly. One that could avoid filling up dirty dishes in kitchen sinks; one that could avoid a physically painful loading process; one that could keep dirty dishes from attracting of microscopic germs; one that could keep dirty dishes from drying out; one that could conserve energy and water; one that could be as fast as hand washing of dishes; and finally one that could clean each dish with individual attention to ensure every dish comes out clean after cleaning.

SUMMARY

The invention is a system and method for loading, cleaning, and storing reusable dishes with individual attention in real time.

In some embodiments, the invention is a system for cleaning a reusable dish, comprising: a load module disposed to contain at least one dirty dish, wherein said dirty dish is stained with material that needs to be removed prior to reuse; a wash module having the means to transform said dirty dish into a clean dish, wherein said clean dish does not exhibit any material that needs to be removed prior to reuse; a store module for storing said clean dish, wherein said store module is disposed to contain at least one clean dish; and a robotic arm configured to pick said dirty dish from load module; transport said dirty dish from load module to wash module; transport said clean dish from wash module to store module; and drop off said clean dish in store module, whereby each dirty dish is cleaned thoroughly and efficiently with individual attention in real time.

In some embodiments, the invention is a method for cleaning a reusable dish, comprising: picking a dirty dish from a load module disposed to contain at least one dirty dish with a robotic arm, wherein said dirty dish is stained with material that needs to be removed prior to reuse; transporting said dirty dish from said load module to a wash module with said robotic arm; cleaning said dirty dish in said wash module having the means to transform said dirty dish into a clean dish, wherein said clean dish does not exhibit any material that needs to be removed prior to reuse; transporting said clean dish from said wash module to a store module with said robotic arm; and dropping off said clean dish in said store module, wherein said store module is disposed to contain at least one clean dish, whereby each dirty dish is cleaned thoroughly and efficiently with individual attention in real time.

DETAILED DESCRIPTION OF THE PREFERRED EMBODIMENTS

Figure 1:
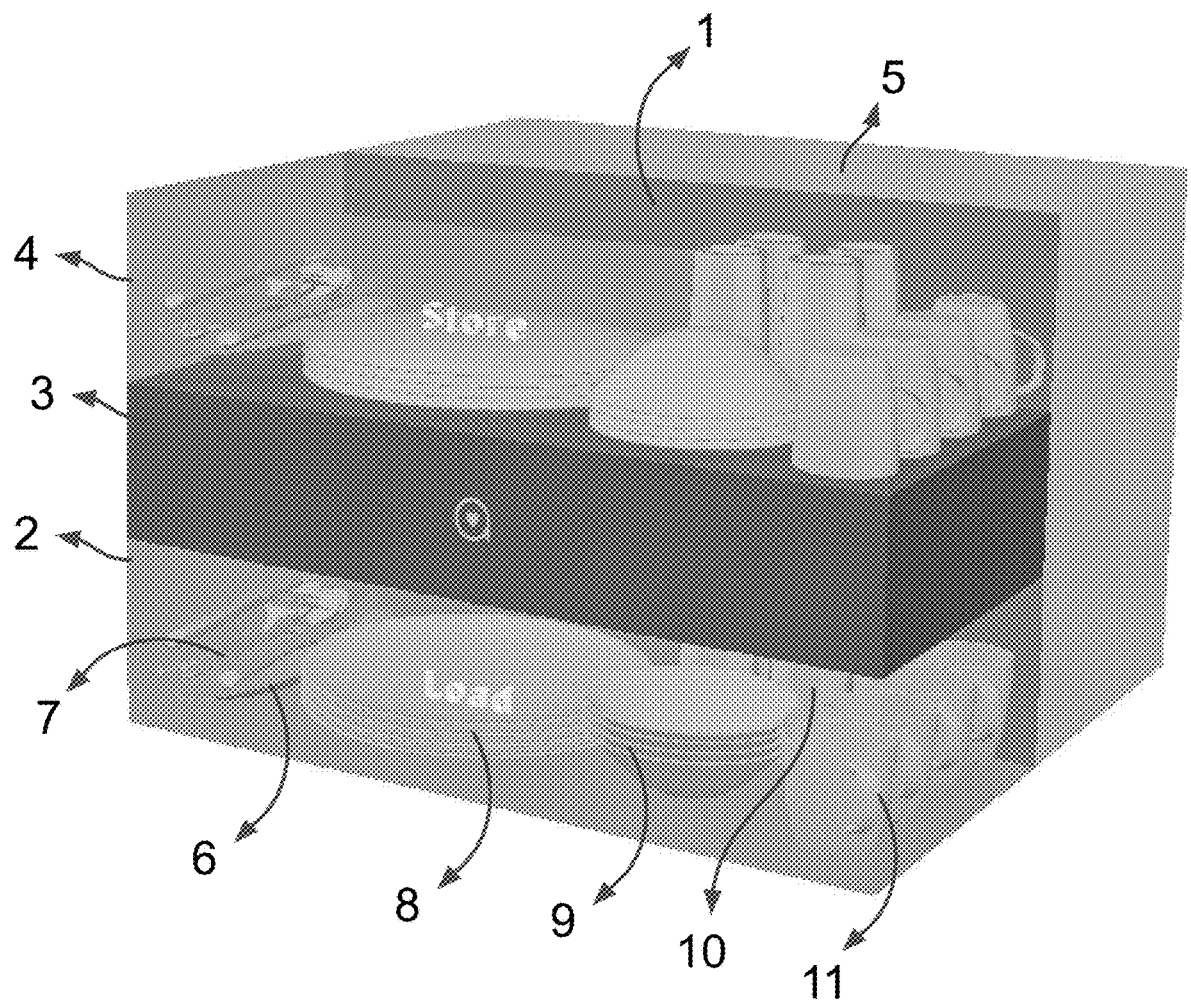
FIG. 1 shows a three-dimensional view of a real-time single dish cleaner having a vertical arrangement of load module, wash module, and store module, in accordance with the invention.

FIG. 1. shows a three-dimensional view of a real-time single dish cleaner 1 having a vertical arrangement of a load module 2, a wash module 3, and a store module 4, in accordance with the invention. The wash module 3 is located above the load module 2, and the store module 4 is located above the wash module 3. A robot module 5 is located behind the vertical stack comprising load 2, wash 3, and store 4 modules. In some embodiments, load module 2, wash module 3, and store module 4 are arranged horizontally or substantially along a curve.

The load module 2 comprises different kinds of dishes that need to be cleaned prior to reuse. A dish is an article that makes contact with a food or a drink while preparing, serving, consuming, or storing of the food or the drink. For example, dishes include flatware 7, plates 8, bowls 9, cups 10, and mugs 11. Flatware 7 includes spoons, forks, knives, and chopsticks. Dishes also include pots, pans, and other kitchen utensils used for preparing, serving, or storing food.

In some embodiments, the dirty dishes of a particular kind are stacked on top of each other to conserve space. For example, dirty plates are stacked on top of other dirty plates. Similarly, dirty bowls may be stacked on top of other dirty bowls. In other embodiments, dirty dishes are placed individually on the floor of the load module. For example, dirty mugs and cups may not be stacked and be placed on the floor of the load module. In some embodiments, dirty dishes of different kinds may be stacked on top of each other. For example, a dirty bowl may be placed on top of a dirty plate. Similarly, a dirty spoon may be placed inside a bowl.

In some embodiments, dirty dishes of a particular kind are placed in a predetermined location designated for the kind inside the load module 2. For example, dirty plates may be placed in one predetermined location and dirty bowls may be placed in another predetermined location. To facilitate the above, such embodiments have the means to indicate the preferred location and orientation of a dish of a particular kind. For instance, indications include text, drawings, or other visible structures of names or shapes of dishes of different kinds. Indications could also include a tray 6 or a slot to hold silverware. In other embodiments, dirty dishes of any kind may be placed anywhere within the load module 2.

In some embodiments, dirty dishes in the load module 2 are oriented right side up to avoid spilling of material that needs to be removed prior to reuse. For example, a bowl with some leftover soup is placed right-side up to avoid spilling the soup within the load module 2. In other embodiments, dirty dishes in the load module 2 are placed with any orientation regardless of concerns of spilling of material that needs to be removed prior to reuse. In such embodiments, material spilled is collected and removed from the load module 2 using water, soap, and a liquid pump.

In some embodiments, the load module 2 comprises a front door configured to open when a dirty dish is ready to be placed inside the load module. In some embodiments, the load module comprises a camera or a sensor to detect when a dirty dish ready to be placed inside the load module. In some embodiments, load module comprises a camera to record at least one image of a dirty dish. The image of the dirty dish is then processed with a processor to detect, identify, and localize the position and orientation of the dirty dish. The position and orientation information of a dirty dish is required to facilitate picking the dirty dish up from the load module.

The wash module 3 has the means to transform a dirty dish into a clean dish. A clean dish is a dish that does not exhibit any material that needs to be removed prior to reuse of the dish. In some embodiments, wash module 3 uses a combination of pressurized water, soap, and rinse agent to clean a dirty dish. In some embodiments, wash module 3 comprises a mechanical scrubber to clean a dirty dish. In other embodiments, wash module 3 uses high frequency vibrations such as ultrasonic vibrations to clean a dirty dish. In some embodiments, wash module 3 uses heat to dry a clean dish.

In some embodiments, wash module 3 comprises a camera to record at least one image of a dirty dish and one image of a clean dish. The images of the dirty and clean dishes are then processed with a processor to inspect for the presence of dirt before, during, or after cleaning of the dish. Such inspection is used to provide the feedback necessary to adapt the cleaning process based on the amount of dirt present in the dish. For instance, if inspection determines that dirt is present predominantly in specific regions of a dish, then the cleaning process is adapted to focus on removing dirt from those specific regions. In another instance, if no dirt is detected on a dish during a cleaning process, then no further resources are spent on cleaning the dish.

In some embodiments, a dish in wash module 3 is oriented to avoid holding of material that needs to be removed prior to reuse or holding of any material used for cleaning. For instance, a dirty bowl may be held upside down to avoid holding and thereby facilitating rapid disposal of food or drink, soap, rinse agent, and water. In some embodiments, wash module 3 cleans all sides of a dirty dish simultaneously. For instance, the front side and the back side of a dirty plate or a bowl is cleaned simultaneously. In other embodiments, wash module 3 cleans one side of the dirty dish at one time and another side of the dirty dish subsequently. For instance, in such embodiments, the front side and the back side of a dirty plate or a dirty bowl are cleaned at different times, one after another.

The store module 4 is disposed to contain at least one clean dish. In some embodiments, store module 4 comprises a camera to record at least one image of the store module 4 and a processor to detect, identify, and localize the position and orientation of any clean dishes located in the store module. The position and orientation information of clean dishes is required to facilitate dropping off a freshly cleaned clean dish into the store module 4. In some embodiments, a clean dish in store module 4 is oriented to facilitate drying of the clean dish. For example, a plate or a bowl in store module 4 may be oriented upside down to avoid holding of water and promote drying. In some embodiments, store module 4 uses heat to facilitate drying of clean dishes. In some embodiments, store module 4 comprises a door configured to open when a clean dish is ready to be taken from the store module 4. In some embodiments, the store module comprises a camera or a sensor to detect when a clean dish is ready to be taken from the store module.

The robot module 5 comprises a robotic arm configured to pick up a dirty dish from the load module 2 and transport the dirty dish from load module 2 to wash module 3. Once the dirty dish is cleaned by the wash module 3, the robotic arm transports the clean dish from wash module 3 to store module 4 and drops off the clean dish in store module 4.

In some embodiments, the robotic arm in robot module 5 has an end effector to gently pick up a dirty dish from load module 2; firmly hold a dish while transporting the dish from one module to another (from load module to wash module 3, and from wash module 3 to store module 4); and gently drop off a clean dish in the store module 4. For instance, an end effector may comprise jaws (or claws) that electromechanically close to grip a dish. In another example, an end effector utilizes vacuum to pick up, hold, and drop off a dish. In some embodiments, the end effector holds a dish during the cleaning process in the wash module 3. In other embodiments, the end effector drops off a dirty dish in wash module 3 and picks the dish up from the wash module 3 after the cleaning process is complete. In some embodiments, wash module 3 cleans the end effector before the end effector makes contact with a clean dish.

The robotic arm comprises enough degrees of freedom to position its end effector to pick up a dish from the load module 2, hold the dish while transporting it from one module to another, and drop off the dish in store module 4. In some embodiments, the robotic arm turns the orientation of a dish from right-side up orientation to an upside down orientation. In some embodiments, the robotic arm can position its end effector at multiple locations with multiple orientations inside the load, wash, and store modules. In some embodiments, the robotic arm comprises 6 axes of rotational freedom. In some embodiments, the robotic arm comprises 2 axes of translational freedom and one axis of rotational freedom. In other embodiments, the robotic arm comprises three axes of translational freedom. In some embodiments, the robotic arm comprises three axes of translational freedom along with one axis of rotational freedom. In other embodiments, the robotic arm comprises three axes of translational freedom along with two axes of rotational freedom.

In some embodiments, the load module 2 also comprises a back door in between the load module 2 and the robot module 5. This back door of load module 2 is configured to open when the robotic arm is ready to enter into load module 2. In some embodiments, the load module or the robot module comprises a camera or a sensor to detect when the robotic arm is ready to enter into the load module. In some embodiments, store module 4 comprises a back door in between the store module 4 and the robot module 5. This back door of store module 4 is configured to open when the robotic arm is ready to enter into the store module 4. In some embodiments, the store module or the robot module comprises a camera or a sensor to detect when the robotic arm is ready to enter into the store module.

In some embodiments, the total height of the real-time single dish cleaner 1 is designed so it fits on a kitchen countertop under the shelves. For instance, in some embodiments, the total height of the real-time single dish cleaner 1 is under 18 inches. In some embodiments, the total width of the real-time single dish cleaner 1 is designed so it fits on a kitchen countertop. For instance, in some embodiments, the total width of the real-time single dish cleaner 1 is under 25 inches.

Figure 2:
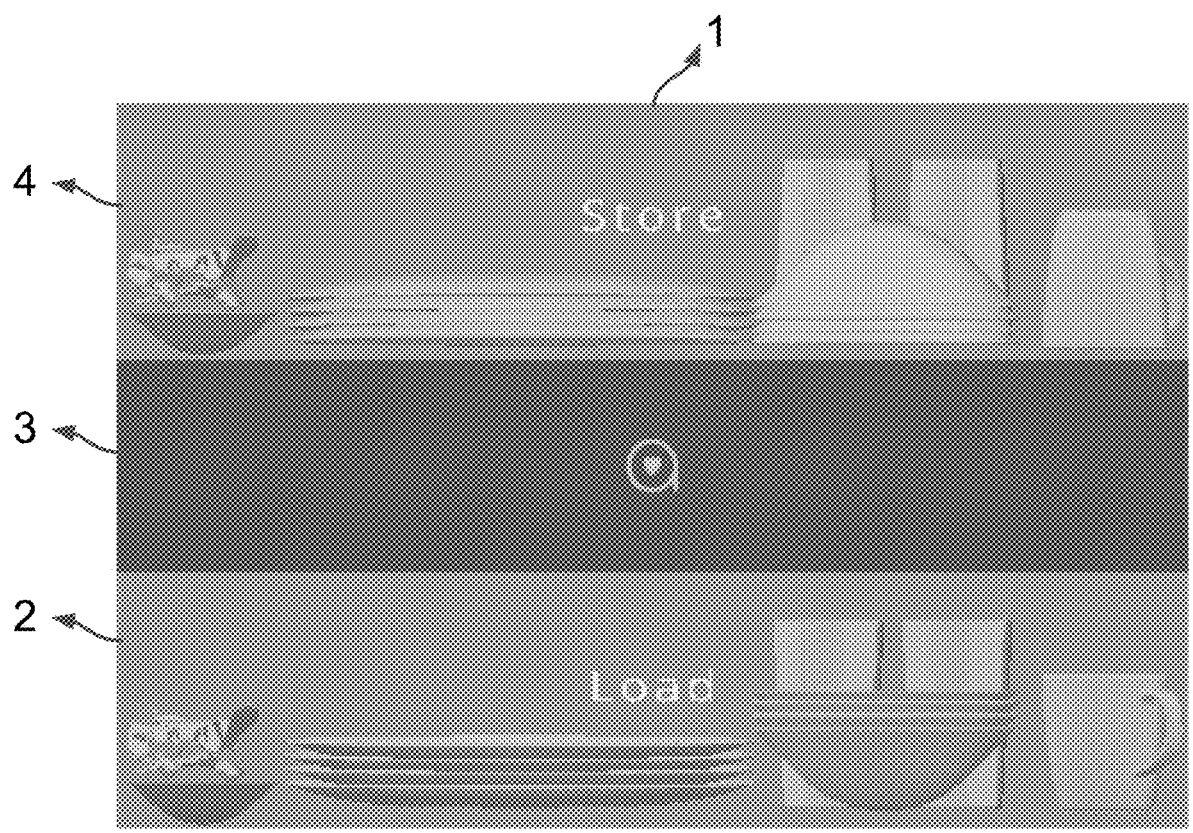
FIG. 2 shows a front view of a real-time single dish cleaner having a vertical arrangement of load module, wash module, and store module, in accordance with the invention.

FIG. 2 shows a front view of a real-time single dish cleaner 1 having a vertical arrangement of load module 2, wash module 3, and store module 4, in accordance with the invention. Robot module 5 is located behind the load, wash, and store modules.

Figure 3:
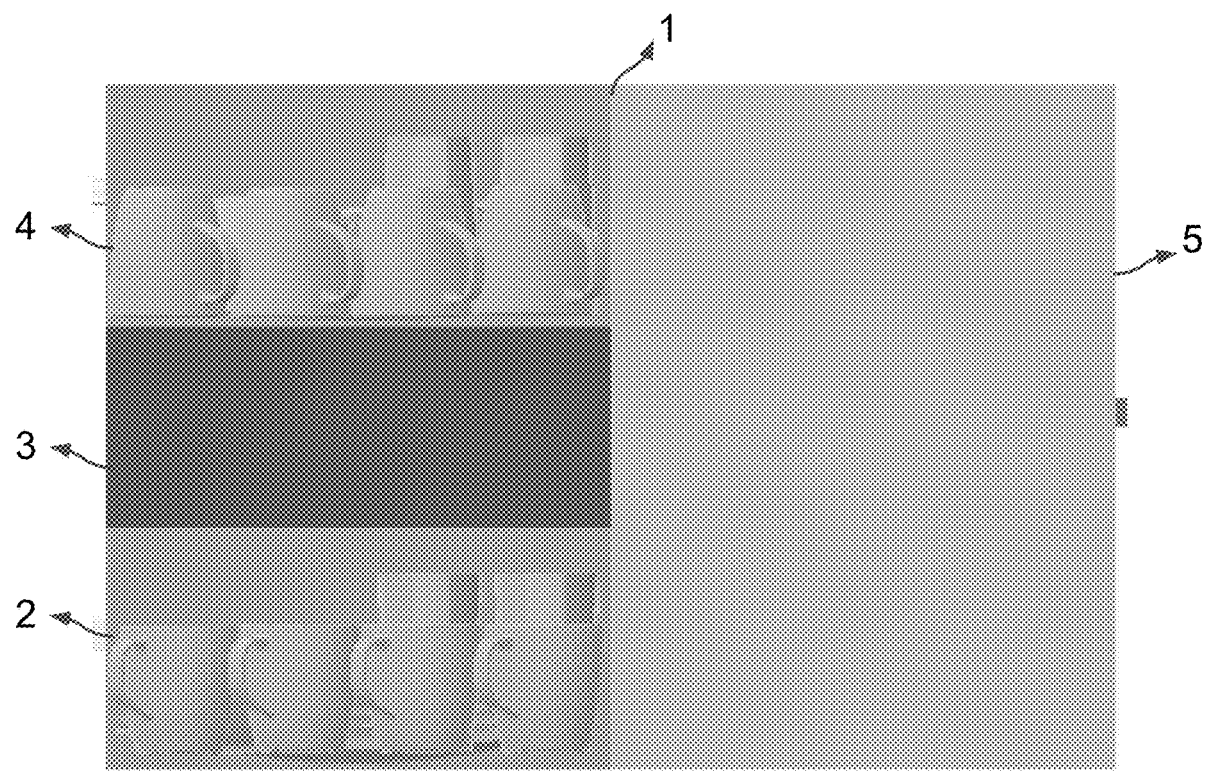
FIG. 3 shows a right-side view of a real-time single dish cleaner having a vertical arrangement of load module, wash module, and store module, in accordance with the invention.

FIG. 3 shows a right-side view of a real-time single dish cleaner 1 having a vertical arrangement of load module 2, wash module 3, and store module 4, in accordance with the invention. Robot module 5 is located behind the load, wash, and store modules.

Figure 4:
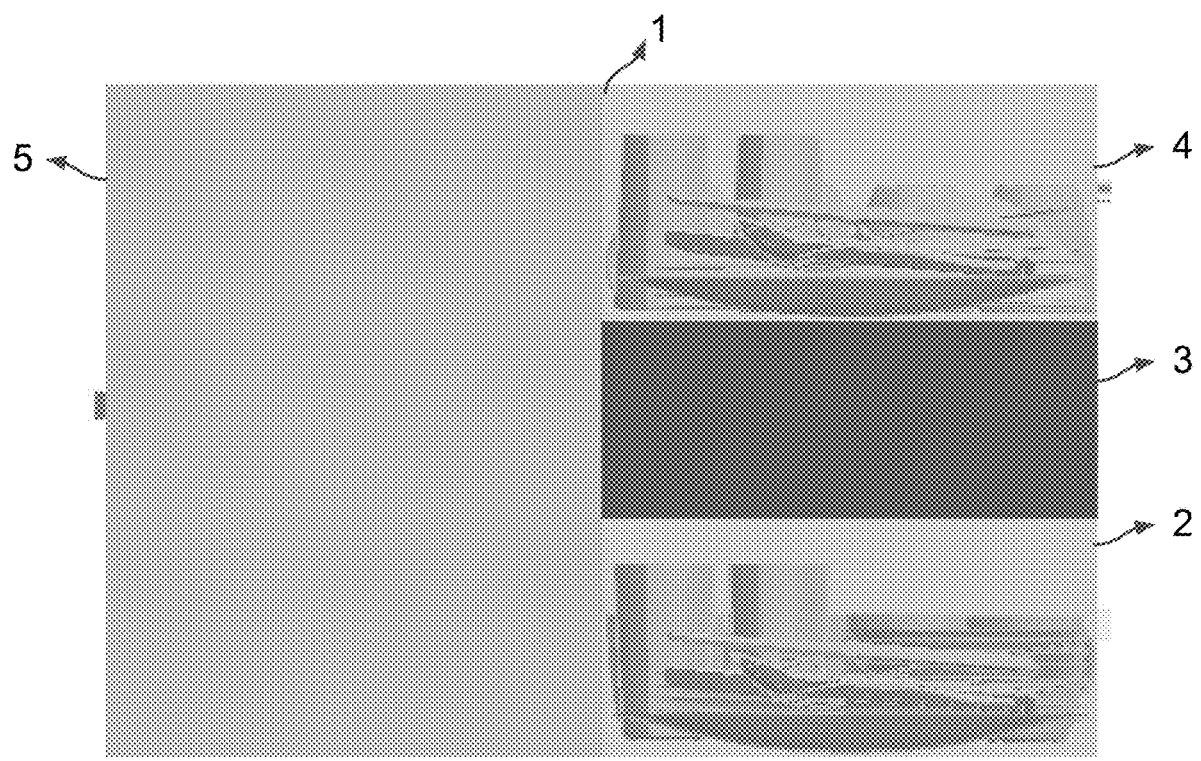
FIG. 4 shows a left-side view of a real-time single dish cleaner having a vertical arrangement of load module, wash module, and store module, in accordance with the invention.

FIG. 4 shows a left-side view of a real-time single dish cleaner 1 having a vertical arrangement of load module 2, wash module 3, and store module 4, in accordance with the invention. Robot module 5 is located behind the load, wash, and store modules.

Figure 5:
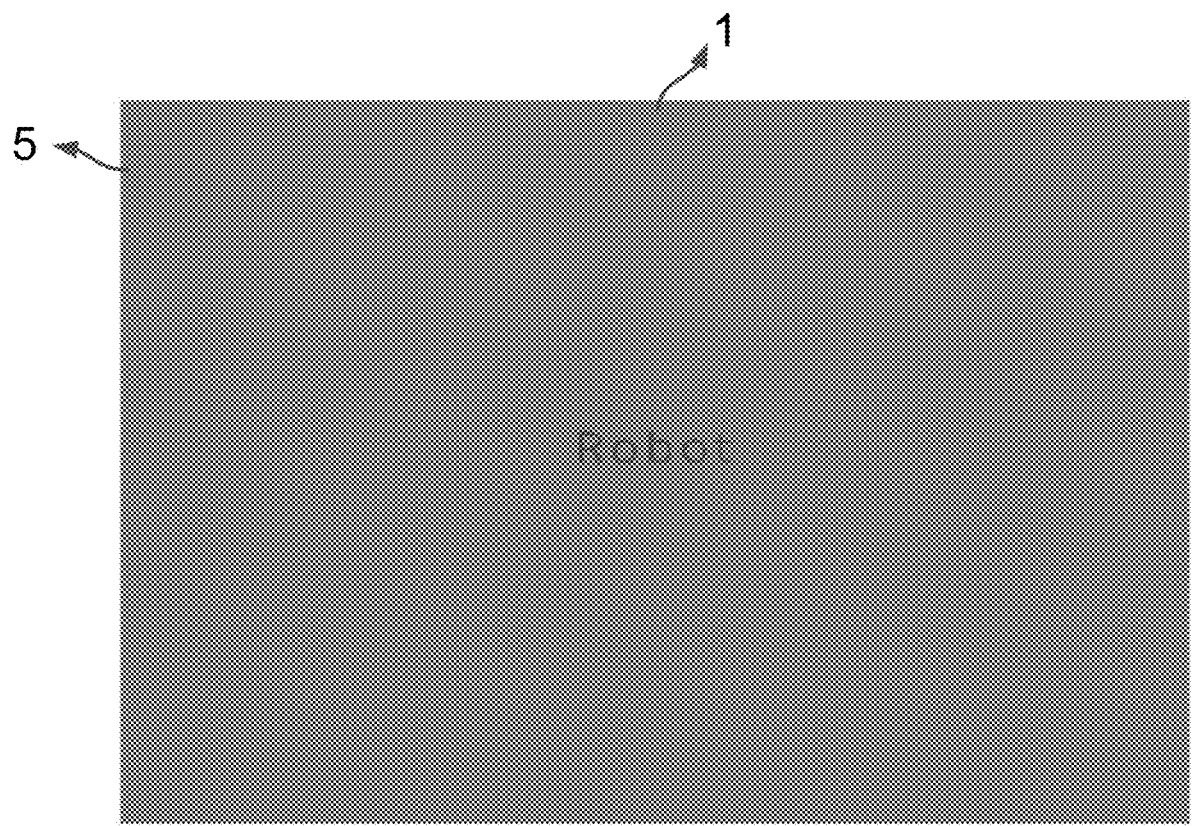
FIG. 5 shows a back view of a real-time single dish cleaner having a vertical arrangement of load module, wash module, and store module, in accordance with the invention.

FIG. 5 shows a back view of a real-time single dish cleaner 1 having a vertical arrangement of load module, wash module, and store module, in accordance with the invention. Robot module 5 is located behind the load, wash, and store modules.

Figure 6:
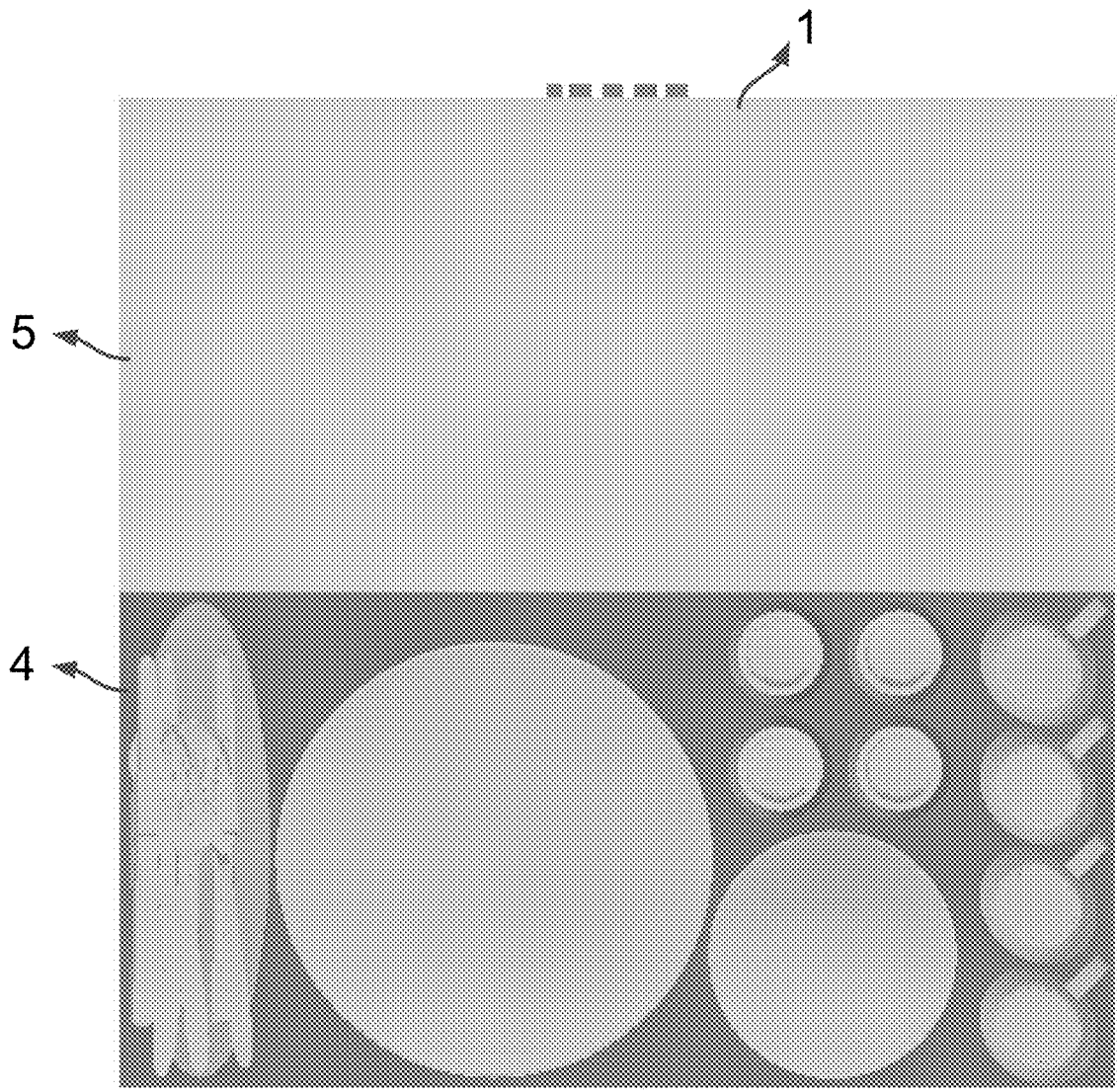
FIG. 6 shows a top view of a real-time single dish cleaner having a vertical arrangement of load module, wash module, and store module, in accordance with the invention.

FIG. 6 shows a top view of a real-time single dish cleaner 1 having a vertical arrangement of load module, wash module, and store module 4, in accordance with the invention. Robot module 5 is located behind the load, wash, and store modules.

Figure 7:
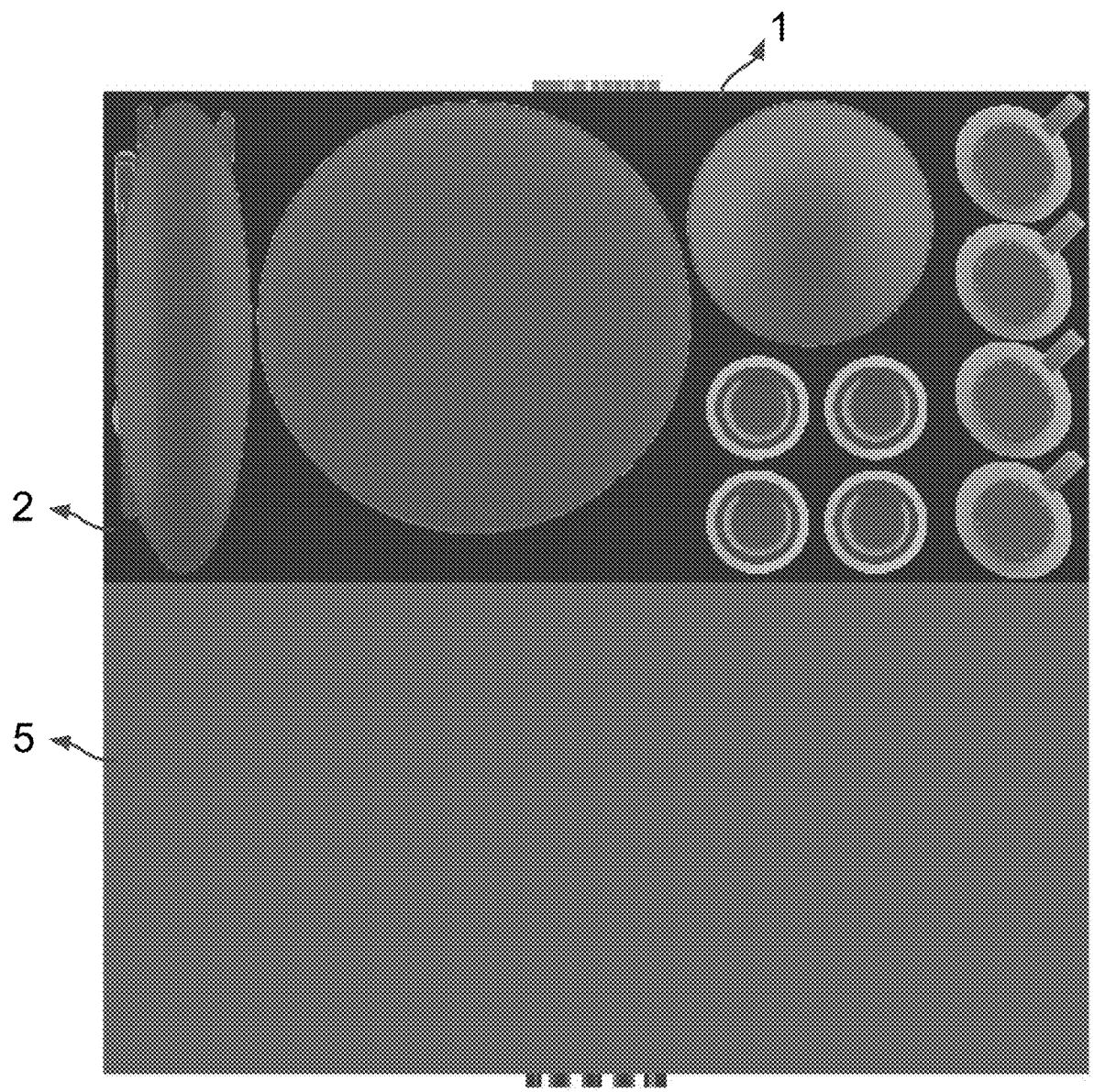
FIG. 7 shows a bottom view of a real-time single dish cleaner having a vertical arrangement of load module, wash module, and store module, in accordance with the invention.

FIG. 7 shows a bottom view of a real-time single dish cleaner 1 having a vertical arrangement of load module 2, wash module 3, and store module, in accordance with the invention. Robot module 5 is located behind the load, wash, and store modules.

Figure 8:
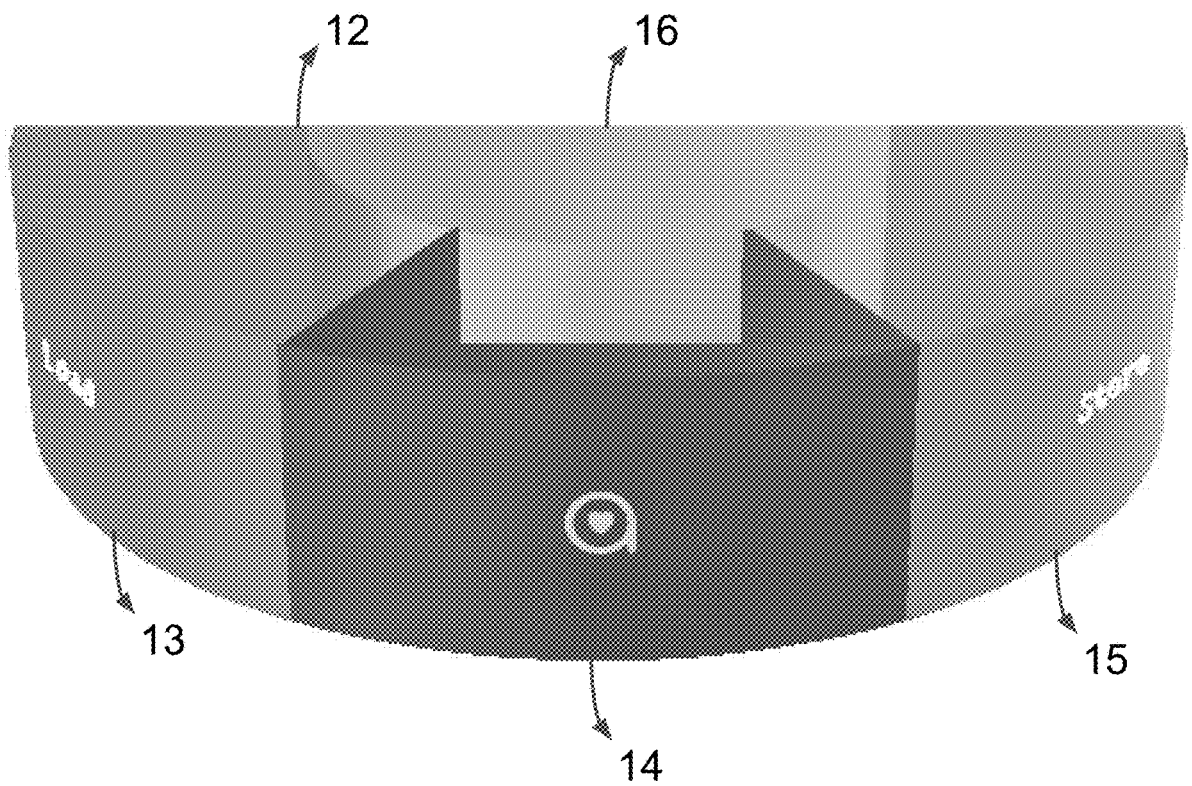
FIG. 8 shows a three-dimensional view of a real-time single dish cleaner having a curved arrangement of load module, wash module, and store module, in accordance with the invention.

FIG. 8 shows a three-dimensional view of a real-time single dish cleaner 12 having a curved arrangement of load module 13, wash module 14, and store module 15, in accordance with the invention. Robot module 16 is located behind the load, wash, and store modules.

The load module 13 comprises different kinds of dishes that need to be cleaned prior to reuse. A dish is an article that makes contact with a food or a drink while preparing, serving, consuming, or storing of the food or the drink. For example, dishes include flatware, plates, bowls, cups, and mugs. Flatware includes spoons, forks, knives, and chopsticks. Dishes also include pots, pans, and other kitchen utensils used for preparing or storing food.

In some embodiments, the dirty dishes of a particular kind are stacked on top of each other to conserve space. For example, dirty plates are stacked on top of other dirty plates. Similarly, dirty bowls may be stacked on top of other dirty bowls. In other embodiments, dirty dishes are placed individually on the floor of the load module. For example, dirty mugs and cups may not be stacked and be placed on the floor of the load module. In some embodiments, dirty dishes of different kinds may be stacked on top of each other. For example, a dirty bowl may be placed on top of a dirty plate. Similarly, a dirty spoon may be placed in a bowl.

In some embodiments, dirty dishes of a particular kind are placed in a predetermined location designated for the kind inside the load module 13. For example, dirty plates may be placed in one predetermined location and dirty bowls may be placed in another predetermined location. To facilitate the above, such embodiments have the means to indicate the preferred location and orientation of dishes of a particular kind. For instance, indications include text, drawings, or other visible structures of names or shapes of dishes of different kinds. Indications could also include a tray or a slot to hold silverware. In other embodiments, dirty dishes of any kind may be placed anywhere within the load module 13.

In some embodiments, dirty dishes in the load module 13 are oriented right side up to avoid spilling of material that needs to be removed prior to reuse. For example, a bowl with some leftover soup is placed right-side up to avoid spilling the soup within the load module 13. In other embodiments, dirty dishes in the load module 13 are placed with any orientation regardless of concerns of spilling of material that needs to be removed prior to reuse. In such embodiments, material spilled is collected and removed from the load module 13 using water, soap, and a liquid pump.

In some embodiments, the load module 13 comprises a front door configured to open when a dirty dish is ready to be placed inside the load module. In some embodiments, the load module 13 comprises a camera or a sensor to detect when a dirty dish is ready to be placed inside the load module. In some embodiments, load module 13 comprises a camera to record at least one image of a dirty dish. The image of the dirty dish is then processed with a processor to detect, identify, and localize the position and orientation of the dirty dish. The position and orientation information of a dirty dish is required to facilitate picking the dirty dish up from the load module.

The wash module 14 has the means to transform a dirty dish into a clean dish. A clean dish is a dish that does not exhibit any material that needs to be removed prior to reuse of the dish. In some embodiments, wash module 14 uses a combination of pressurized water, soap, and rinse agent to clean a dirty dish. In some embodiments, wash module 14 comprises a mechanical scrubber to clean a dirty dish. In other embodiments, wash module 14 uses high frequency vibrations such as ultrasonic vibrations to clean a dirty dish. In some embodiments, wash module 14 uses heat to dry a clean dish.

In some embodiments, wash module 14 comprises a camera to record at least one image of a dirty dish and one image of a clean dish. The images of the dirty and clean dishes are then processed with a processor to inspect for the presence of dirt before, during, or after cleaning of the dish. Such inspection is used to provide the feedback necessary to adapt the cleaning process based on the amount of dirt present in the dish. For instance, if inspection determines that dirt is present predominantly in specific regions of a dish, then the cleaning process is adapted to focus on removing dirt from those specific regions. In another instance, if no dirt is detected on a dish during a cleaning process, then no further resources are spent on cleaning the dish.

In some embodiments, a dish in wash module 14 is oriented to avoid holding of material that needs to be removed prior to reuse or holding of any material used for cleaning. For instance, a dirty bowl may be held upside down to avoid holding and thereby facilitating rapid disposal of food or drink, soap, rinse agent, and water. In some embodiments, wash module 14 cleans all sides of a dirty dish simultaneously. For instance, the front side and the back side of a dirty plate or a bowl is cleaned simultaneously. In other embodiments, wash module 14 cleans one side of the dirty dish at one time and another side of the dirty dish subsequently. For instance, in such embodiments, the front side and the back side of a dirty plate or a dirty bowl are cleaned at different times, one after another.

The store module 15 is disposed to contain at least one clean dish. In some embodiments, store module 15 comprises a camera to record at least one image of the store module 15 and a processor to detect, identify, and localize the position and orientation of any clean dishes located in the store module. The position and orientation information of clean dishes is required to facilitate dropping off a freshly cleaned clean dish into the store module 15. In some embodiments, a clean dish in store module 15 is oriented to facilitate drying of the clean dish. For example, a plate or a bowl in store module 15 may be oriented upside down to avoid holding of water and promote drying. In some embodiments, store module 15 uses heat to facilitate drying of clean dishes. In some embodiments, store module 15 comprises a door configured to open when a clean dish is ready to be taken from the store module 15. In some embodiments, the store module comprises a camera or a sensor to detect when a clean dish is ready to be taken from the store module.

The robot module 16 comprises a robotic arm configured to pick up a dirty dish from the load module and transport the dirty dish from load module to wash module. Once the dirty dish is cleaned by the wash module 14, the robotic arm transports the clean dish from wash module 14 to store module 15 and drops off the clean dish in store module 15.

In some embodiments, the robotic arm in robot module 16 has an end effector to gently pick up a dirty dish from load module 13; firmly hold a dish while transporting the dish from one module to another (from load module to wash module 14, and from wash module 14 to store module 15); and gently drop off a clean dish in the store module 15. For instance, an end effector may comprise jaws (or claws) that electromechanically close to grip a dish. In another example, an end effector utilizes vacuum to pick up, hold, and drop off a dish. In some embodiments, the end effector holds a dish during the cleaning process in the wash module 14. In other embodiments, the end effector drops off a dirty dish in wash module 14 and picks the dish up from the wash module 14 after the cleaning process is complete. In some embodiments, wash module 14 cleans the end effector before the end effector makes contact with a clean dish.

The robotic arm comprises enough degrees of freedom to position its end effector to pick up a dish from load module 13, hold the dish while transporting it from one module to another, and drop off the dish in store module 15. In some embodiments, the robotic arm flips a dish from right-side up orientation to an upside down orientation. In some embodiments, the robotic arm can position its end effector at multiple locations with multiple orientations inside the load, wash, and store modules. In some embodiments, the robotic arm comprises 6 axes of rotational freedom. In some embodiments, the robotic arm comprises 5 axes of rotational freedom. In some embodiments, the robotic arm comprises 1 axes of translational freedom and 5 axes of rotational freedom. In some embodiments, the robotic arm comprises 1 axes of translational freedom and 4 axes of rotational freedom. In some embodiments, the robotic arm comprises 2 axes of translational freedom and 4 axes of rotational freedom. In some embodiments, the robotic arm comprises 2 axes of translational freedom and 3 axes of rotational freedom.

In some embodiments, the load module 13 also comprises a back door in between the load module 13 and the robot module 16. This back door of load module 13 is configured to open when the robotic arm is ready to enter into load module 13. In some embodiments, the load module or the robot module comprises a camera or a sensor to detect when the robotic arm is ready to enter into the load module. In some embodiments, store module 15 comprises a back door in between the store module 15 and the robot module 16. This back door of store module 15 is configured to open when the robotic arm is ready to enter into the store module 15. In some embodiments, the store module or the robot module comprises a camera or a sensor to detect when the robotic arm is ready to enter into the store module.

In some embodiments, the total height of the real-time single dish cleaner 12 is designed so it fits on a kitchen countertop under the shelves. For instance, in some embodiments, the total height of the real-time single dish cleaner 12 is under 18 inches. In some embodiments, the total width of the real-time single dish cleaner 12 is designed so it fits on a kitchen countertop. For instance, in some embodiments, the total width of the real-time single dish cleaner 12 is under 25 inches.

Figure 9:
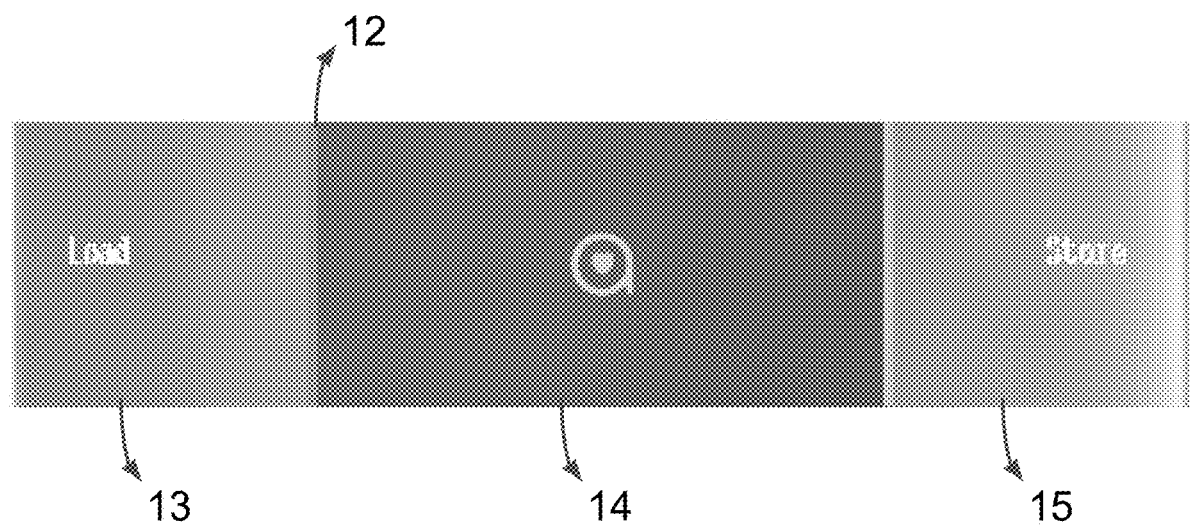
FIG. 9 shows a front view of a real-time single dish cleaner having a curved arrangement of load module, wash module, and store module, in accordance with the invention.

FIG. 9 shows a front view of a real-time single dish cleaner 12 having a curved arrangement of load module 13, wash module 14, and store module 15, in accordance with the invention.

Figure 10:
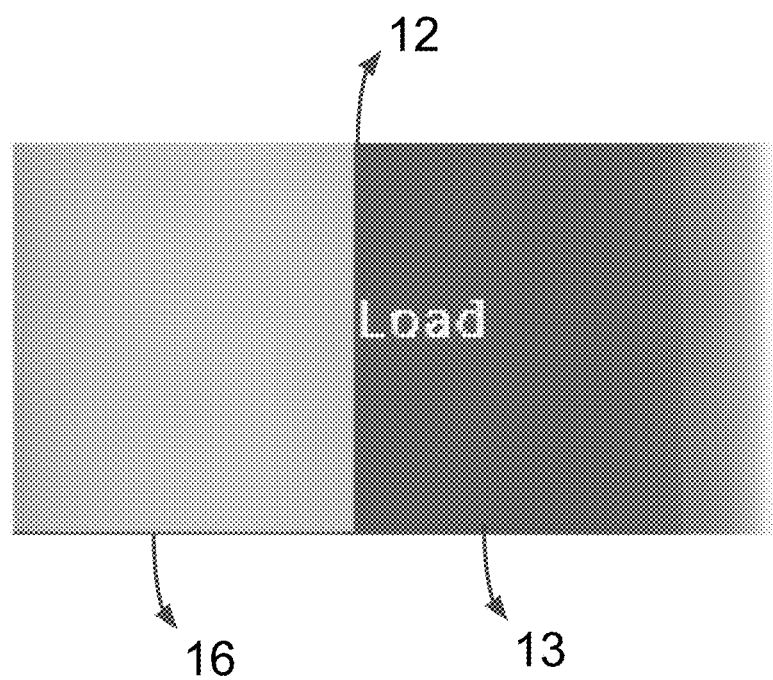
FIG. 10 shows a left-side view of a real-time single dish cleaner having a curved arrangement of load module, wash module, and store module, in accordance with the invention.

FIG. 10 shows a left-side view of a real-time single dish cleaner 12 having a curved arrangement of load module 13, wash module, and store module, in accordance with the invention. Robot module 16 is located behind the load 13, wash, and store modules.

Figure 11:
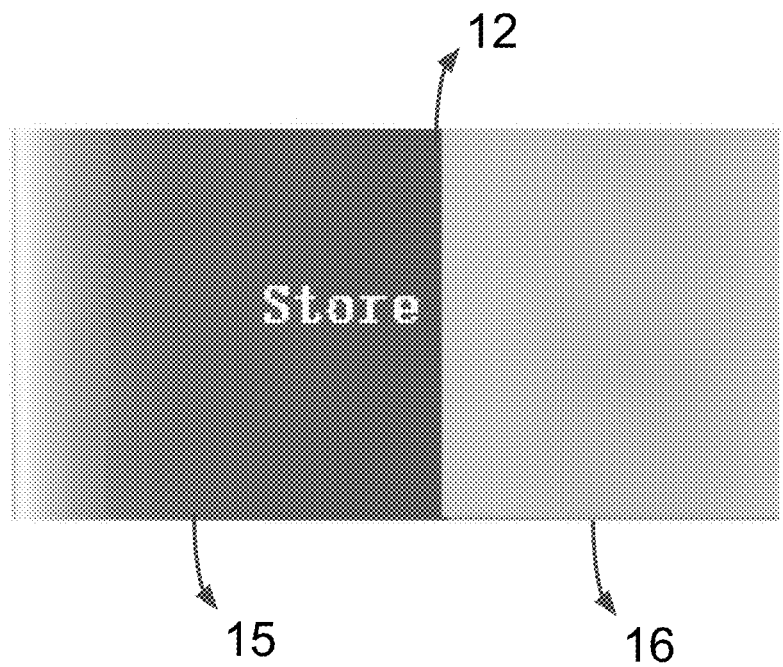
FIG. 11 shows a right-side view of a real-time single dish cleaner having a curved arrangement of load module, wash module, and store module, in accordance with the invention.

FIG. 11 shows a right-side view of a real-time single dish cleaner 12 having a curved arrangement of load module, wash module, and store module 15, in accordance with the invention. Robot module 16 is located behind the load, wash, and store 15 modules.

Figure 12:
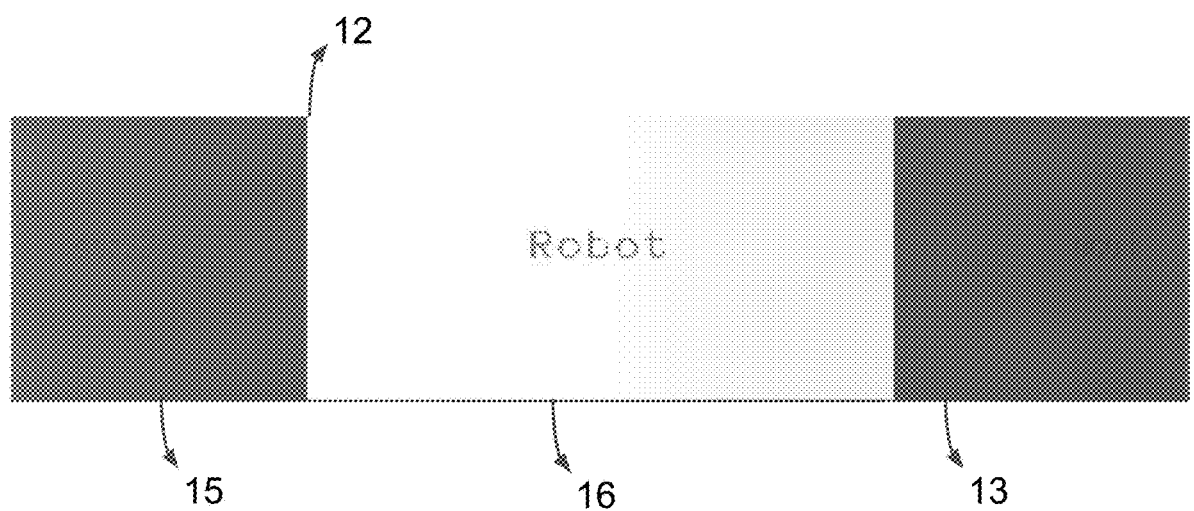
FIG. 12 shows a back view of a real-time single dish cleaner having a curved arrangement of load module, wash module, and store module, in accordance with the invention.

FIG. 12 shows a back view of a real-time single dish cleaner 12 having a curved arrangement of load module 13, wash module, and store module 15, in accordance with the invention. Robot module 16 is located behind the load, wash, and store modules.

Figure 13:
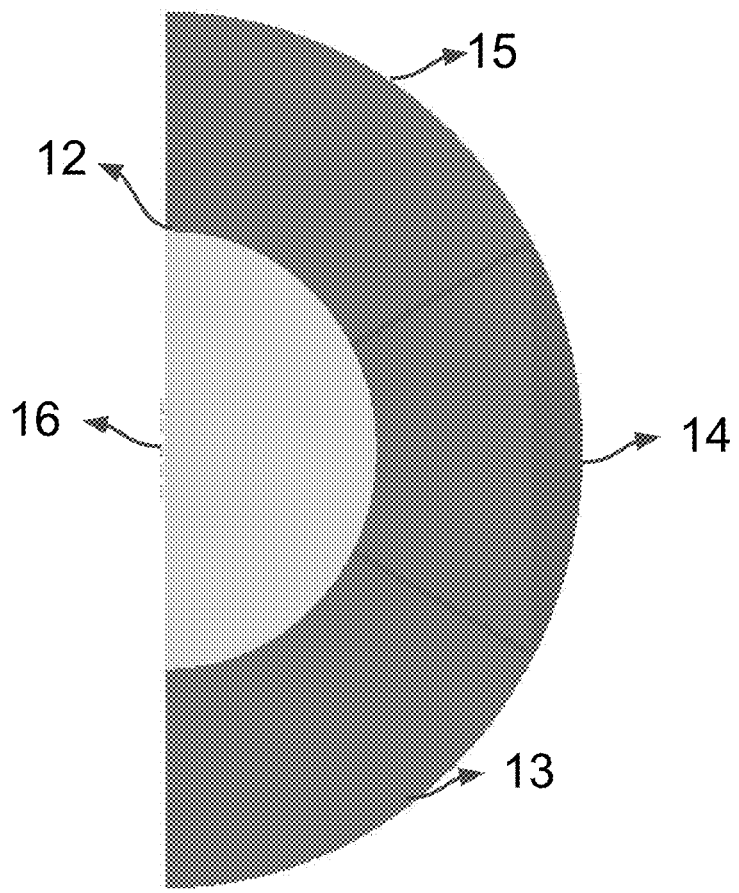
FIG. 13 shows a top view of a real-time single dish cleaner having a curved arrangement of load module, wash module, and store module, in accordance with the invention.

FIG. 13 shows a top view of a real-time single dish cleaner 12 having a curved arrangement of load module 13, wash module 14, and store module 15, in accordance with the invention. Robot module 16 is located behind the load, wash, and store modules.

Figure 14:
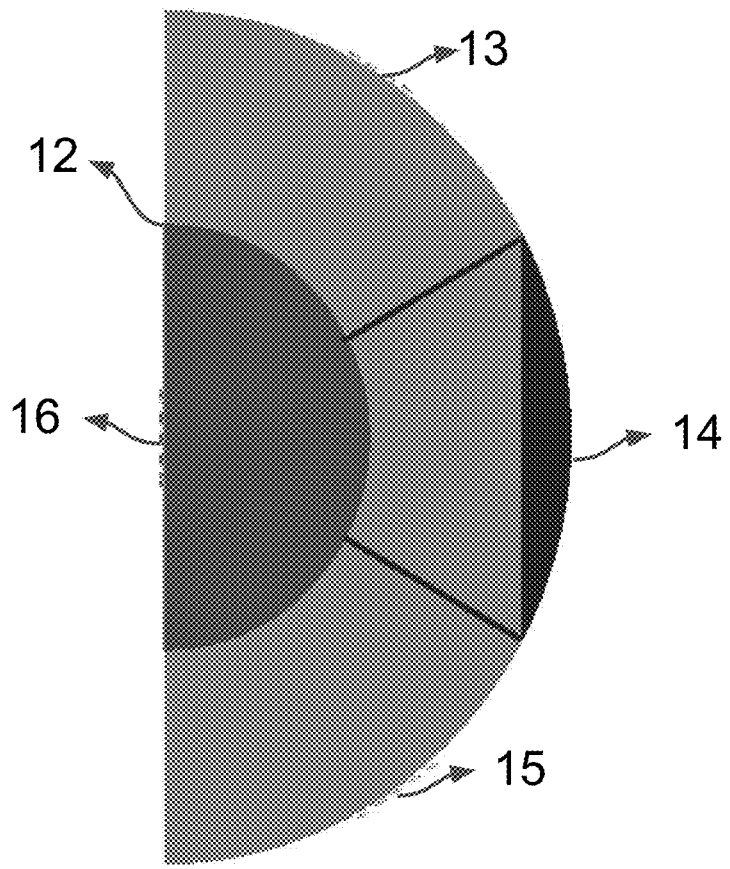
FIG. 14 shows a bottom view of a real-time single dish cleaner having a curved arrangement of load module, wash module, and store module, in accordance with the invention.

FIG. 14 shows a bottom view of a real-time single dish cleaner 12 having a curved arrangement of load module 13, wash module 14, and store module 15, in accordance with the invention. Robot module 16 is located behind the load, wash, and store modules.

Figure 15:
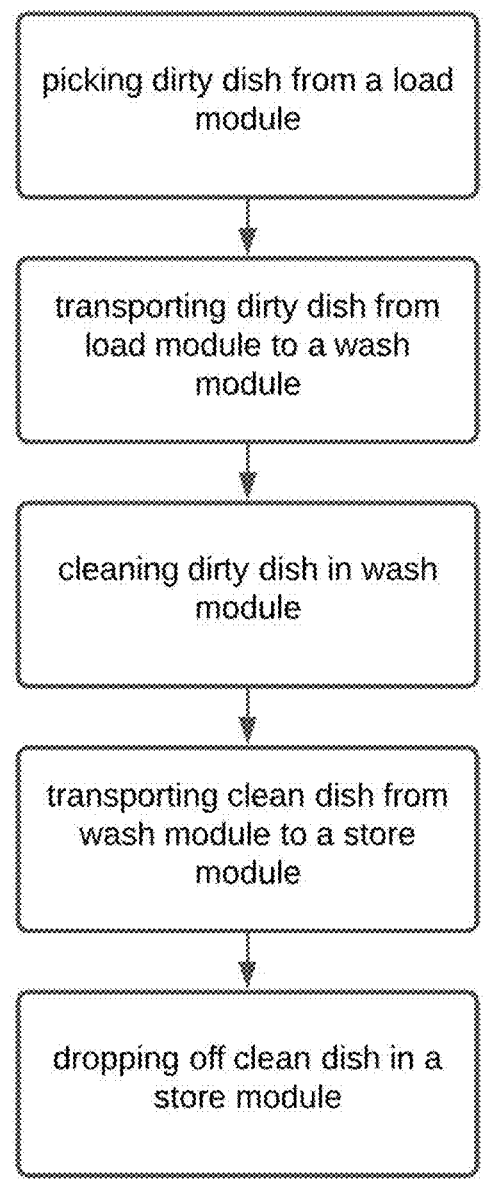
FIG. 15 shows a method for cleaning a reusable dish, in accordance with the invention.

FIG. 15 shows a method for cleaning a reusable dish, in accordance with the invention. The first step involves picking a dirty dish from a load module disposed to contain at least one dirty dish with a robotic arm, wherein the dirty dish is stained with material that needs to be removed prior to reuse. The load module comprises different kinds of dishes that need to be cleaned prior to reuse. A dish is an article that makes contact with a food or a drink while preparing, serving, consuming, or storing of the food or the drink. For example, dishes include flatware, plates, bowls, cups, and mugs. Flatware includes spoons, forks, knives, and chopsticks. Dishes also include pots, pans, and other kitchen utensils used for preparing or storing food.

In some embodiments, the dirty dishes of a particular kind are stacked on top of each other to conserve space. For example, dirty plates are stacked on top of other dirty plates. Similarly, dirty bowls may be stacked on top of other dirty bowls. In other embodiments, dirty dishes are placed individually on the floor of the load module. For example, dirty mugs and cups may not be stacked and be placed on the floor of the load module. In some embodiments, dirty dishes of different kinds may be stacked on top of each other. For example, a dirty bowl may be placed on top of a dirty plate. Similarly, a dirty spoon may be placed in a bowl.

In some embodiments, dirty dishes of a particular kind are placed in a predetermined location designated for the kind inside the load module. For example, dirty plates may be placed in one predetermined location and dirty bowls may be placed in another predetermined location. To facilitate the above, such embodiments have the means to indicate the preferred location and orientation of dishes of a particular kind. For instance, indications include text, drawings, or other visible structures of names or shapes of dishes of different kinds. Indications could also include a tray or a slot to hold silverware.

In other embodiments, dirty dishes of any kind may be placed anywhere within the load module. In some embodiments, dirty dishes in the load module are oriented right side up to avoid spilling of material that needs to be removed prior to reuse. For example, a bowl with some leftover soup is placed right-side up to avoid spilling the soup within the load module. In other embodiments, dirty dishes in the load module are placed with any orientation regardless of concerns of spilling of material that needs to be removed prior to reuse. In such embodiments, material spilled is collected and removed from the load module using water, soap, and a liquid pump.

In some embodiments, the load module comprises a front door configured to open when a dirty dish is ready to be placed inside the load module. In some embodiments, the load module comprises a camera or a sensor to detect when a dirty dish ready to be placed inside the load module. In some embodiments, load module comprises a camera to record at least one image of a dirty dish. The image of the dirty dish is then processed with a processor to detect, identify, and localize the position and orientation of the dirty dish. The position and orientation information of a dirty dish is required to facilitate picking the dirty dish up from the load module.

The second step involves transporting the dirty dish from the load module to a wash module with a robotic arm. In some embodiments, the robotic arm has an end effector to gently pick up a dirty dish from load module; firmly hold a dish while transporting the dish from one module to another (from load module to wash module, and from wash module to store module); and gently drop off a clean dish in the store module. For instance, an end effector may comprise jaws (or claws) that electromechanically close to grip a dish. In another example, an end effector utilizes vacuum to pick up, hold, and drop off a dish. In some embodiments, the end effector holds a dish during the cleaning process in the wash module. In other embodiments, the end effector drops off a dirty dish in wash module and picks the dish up from the wash module after the cleaning process is complete. In some embodiments, wash module cleans the end effector before the end effector makes contact with a clean dish.

The robotic arm comprises enough degrees of freedom to position its end effector to pick up a dish from load module, hold the dish while transporting it from one module to another, and drop off the dish in store module. In some embodiments, the robotic arm flips a dish from right-side up orientation to an upside down orientation. In some embodiments, the robotic arm can position its end effector at multiple locations with multiple orientations inside the load, wash, and store modules. In some embodiments, the robotic arm comprises 6 axes of rotational freedom. In some embodiments, the robotic arm comprises 5 axes of rotational freedom. In some embodiments, the robotic arm comprises 1 axes of translational freedom and 5 axes of rotational freedom. In some embodiments, the robotic arm comprises 1 axes of translational freedom and 4 axes of rotational freedom. In some embodiments, the robotic arm comprises 2 axes of translational freedom and 4 axes of rotational freedom. In some embodiments, the robotic arm comprises 2 axes of translational freedom and 3 axes of rotational freedom. In some embodiments, the robotic arm can position its end effector at multiple locations with multiple orientations inside the load, wash, and store modules. In some embodiments, the robotic arm comprises 6 axes of rotational freedom. In some embodiments, the robotic arm comprises 2 axes of translational freedom and one axis of rotational freedom. In other embodiments, the robotic arm comprises three axes of translational freedom. In some embodiments, the robotic arm comprises three axes of translational freedom along with one axis of rotational freedom. In other embodiments, the robotic arm comprises three axes of translational freedom along with two axes of rotational freedom.

The third step involves cleaning the dirty dish in the wash module having the means to transform the dirty dish into a clean dish, wherein the clean dish does not exhibit any material that needs to be removed prior to reuse. In some embodiments, wash module uses a combination of pressurized water, soap, and rinse agent to clean a dirty dish. In some embodiments, wash module comprises a mechanical scrubber to clean a dirty dish. In other embodiments, wash module uses high frequency vibrations such as ultrasonic vibrations to clean a dirty dish. In some embodiments, wash module uses heat to dry a clean dish.

In some embodiments, wash module comprises a camera to record at least one image of a dirty dish and one image of a clean dish. The images of the dirty and clean dishes are then processed with a processor to inspect for the presence of dirt before, during, or after cleaning of the dish. Such inspection is used to provide the feedback necessary to adapt the cleaning process based on the amount of dirt present in the dish. For instance, if inspection determines that dirt is present predominantly in specific regions of a dish, then the cleaning process is adapted to focus on removing dirt from those specific regions. In another instance, if no dirt is detected on a dish during a cleaning process, then no further resources are spent on cleaning the dish.

In some embodiments, a dish in wash module is oriented to avoid holding of material that needs to be removed prior to reuse or holding of any material used for cleaning. For instance, a dirty bowl may be held upside down to avoid holding and thereby facilitating rapid disposal of food or drink, soap, rinse agent, and water. In some embodiments, wash module cleans all sides of a dirty dish simultaneously. For instance, the front side and the back side of a dirty plate or a bowl is cleaned simultaneously. In other embodiments, wash module cleans one side of the dirty dish at one time and another side of the dirty dish subsequently. For instance, in such embodiments, the front side and the back side of a dirty plate or a dirty bowl are cleaned at different times, one after another.

The fourth step involves transporting the clean dish from the wash module to a store module with the robotic arm. The fifth step involves dropping off a clean dish in the store module, wherein the store module is disposed to contain at least one clean dish. The store module is disposed to contain at least one clean dish. In some embodiments, store module comprises a camera to record at least one image of the store module and a processor to detect, identify, and localize the position and orientation of any clean dishes located in the store module. The position and orientation information of clean dishes is required to facilitate dropping off a freshly cleaned clean dish into the store module. In some embodiments, a clean dish in store module is oriented to facilitate drying of the clean dish. For example, a plate or a bowl in store module may be oriented upside down to avoid holding of water and promote drying. In some embodiments, store module uses heat to facilitate drying of clean dishes. In some embodiments, store module comprises a door configured to open when a clean dish is ready to be taken from the store module. In some embodiments, the store module comprises a camera or a sensor to detect when a clean dish is ready to be taken from the store module.

In this method of cleaning a reusable dish, each dirty dish is cleaned thoroughly and efficiently with individual attention in real time. In some instances, this method of cleaning a reusable dish further comprises turning the orientation of a dirty dish from a right side up orientation to an upside down orientation before cleaning the dirty dish in the wash module.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described above, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a storage device such as a solid state drive (SSD) or a hard drive. Any such computer readable medium may reside on or within a single computational apparatus, and may be present on or within different computational apparatuses within a system or network.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A system for cleaning reusable dishes, comprising:
    a. a load module disposed to contain a plurality of dirty dishes, wherein said dirty dishes are stained with material that needs to be removed prior to reuse;
    b. a wash module having the means to transform a single dirty dish into a clean dish, wherein said clean dish does not exhibit any material that needs to be removed prior to reuse;
    c. a store module for storing a plurality of clean dishes, wherein said store module is arranged as a vertical stack together with said load module; and
    d. a robot module comprising a robotic arm configured to perform an ordered sequence of actions comprising picking a single dirty dish from load module; transporting said dirty dish from load module to wash module; holding said dirty dish during cleaning in wash module to transform said dirty dish into a single clean dish; transporting said clean dish from wash module to store module; and dropping off said clean dish in store module, wherein said robotic arm performs said ordered sequence of actions sequentially for an individual dish before said robotic arm makes contact with another dish,
whereby dirty dishes are cleaned thoroughly and efficiently with individual attention in real time.

2. The system of claim 1, wherein said dish is an article that makes contact with a food or a drink while preparing, serving, consuming, or storing of the food or the drink.

3. The system of claim 1, wherein said load module, said wash module, and said store module are arranged vertically, horizontally, or substantially along a curve.

4. The system of claim 1, wherein said robot module is located behind said load module, said wash module, and said store module.

5. The system of claim 1, wherein said load module has means to indicate the preferred location and orientation of a dish of a particular kind.

6. The system of claim 1, wherein said wash module uses a combination of pressurized water, soap, and a rinse agent to clean a dirty dish.

7. The system of claim 1, wherein said wash module uses a mechanical scrubber or ultrasonic vibrations to clean a dirty dish.

8. The system of claim 1, wherein said wash module cleans all sides of a dirty dish simultaneously.

9. The system of claim 1, wherein said wash module cleans one side of said dirty dish at one time and another side of said dirty dish subsequently.

10. The system of claim 1, wherein said load module comprises a camera to record at least one image of a dirty dish and a processor to detect, identify, and localize the position and orientation of said dirty dish.

11. The system of claim 1, wherein said wash module comprises a camera to record at least one image of a dirty dish and one image of a clean dish and a processor to inspect for the presence of dirt before, during, or after cleaning of the dish.

12. The system of claim 1, wherein said store module comprises a camera to record at least one image of the store module and a processor to detect, identify, and localize the position and orientation of any clean dishes located in the store module.

13. The system of claim 1, wherein said dirty dish in said load module is oriented right side up to avoid spilling of material that needs to be removed prior to reuse.

14. The system of claim 1, wherein a dish in said wash module is oriented to avoid holding of material that needs to be removed prior to reuse or holding of any material used for cleaning.

15. The system of claim 1, wherein said clean dish in said store module is oriented to facilitate drying of said clean dish.

16. The system of claim 1, wherein said load module comprises a door configured to open when a dirty dish is ready to be placed inside said load module; and said store module comprises a door configured to open when a clean dish is ready to be taken from said store module.

17. The system of claim 1, wherein said load module comprises a door configured to open when said robotic arm is ready to enter into said load module; and said store module comprises a door configured to open when said robotic arm is ready to enter into said store module.

18. The system of claim 1, wherein said robotic arm turns said dirty dish from a right side up orientation to an upside down orientation before cleaning.

19. The system of claim 1, wherein said robotic arm comprises an end effector to pick up, hold and drop off a dish.

20. The system of claim 19, wherein said wash module cleans said end effector.

* * * * *